United States Patent
Tomita et al.

(12)

(10) Patent No.: US 6,248,258 B1
(45) Date of Patent: Jun. 19, 2001

(54) OXYGEN ABSORBENT

(75) Inventors: Kazuyuki Tomita; Tatsuo Iwai; Tomoharu Himeshima; Takayuki Watanabe; Junko Baba, all of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/332,019

(22) Filed: Jun. 14, 1999

(30) Foreign Application Priority Data

Jun. 16, 1998 (JP) .................................................. 10-168629

(51) Int. Cl.$^7$ .................................................. C09K 15/32
(52) U.S. Cl. ................ 252/188.28; 252/400.51; 252/400.52
(58) Field of Search ......................... 252/188.28, 389.51, 252/389.52, 389.53, 400.51, 400.52

(56) References Cited

U.S. PATENT DOCUMENTS

| | | | |
|---|---|---|---|
| 4,230,595 | 10/1980 | Yamaji et al. ........................ 252/188 |
| 4,908,151 | 3/1990 | Inoue et al. ..................... 252/188.28 |
| 5,286,407 | 2/1994 | Inoue et al. . | |
| 5,415,907 | * 5/1995 | Inoue et al. ........................ 428/36.2 |
| 5,981,676 | * 11/1999 | Gauthier et al. ..................... 526/308 |
| 6,004,477 | * 12/1999 | Nakagawa et al. ............. 252/188.28 |

FOREIGN PATENT DOCUMENTS 0 835 685   4/1998 (EP) .

OTHER PUBLICATIONS

Patent Abstracts of Japan, vol. 016, No. 509 (C–0997)& JP 187238 (Jul. 3, 1992).
Database WPI, Section Ch, Week 9249, Derwent Publications Ltd., & JP 04–298231 (Oct. 22, 1992).

* cited by examiner

Primary Examiner—Joseph D. Anthony
(74) Attorney, Agent, or Firm—Armstrong, Westerman, Hattori, McLeland & Naughton LLP

(57) ABSTRACT

An oxygen absorbent comprising an aliphatic hydrocarbon (s) with an unsaturated group(s) and/or an unsaturated fatty acid compound(s) and a catalyst containing both a transition metal salt(s) and a non-transition metal salt(s) is provided, whereby an oxygen absorbing velocity is remarkedly promoted.

3 Claims, No Drawings

OXYGEN ABSORBENT

BACKGROUND OF THE INVENTION

1) Field on the Invention

The present invention relates to an oxygen absorbent with functions absorbing oxygen, inorganic gases, organic gases and moisture, which is applicable to preservation of metal parts, electronic parts, electrical parts, precise parts, magnetic or optical parts, jewelry, weapons, airplanes, automobiles, glasses, rubber products, photographic films, foodstuffs, medicines, pressed flowers, paintings ancient documents and unearthed articles.

2) Prior Art

Oxygen absorbents containing metal powders, catechol, ascorbic acid, etc., as main ingredients are known. However, it has been required that such oxygen absorbents is used under a high humidity in the interior of the system since they need moisture to absorb oxygen, so that articles to be preserved have been limited. Therefore, an oxygen absorbent requiring no moisture in absorption of oxygen has been desired. Japanese Patent Publication No. 62-60936 discloses an oxygen absorbent containing an unsaturated fatty acid(s) or a fat and oil containing an unsaturated fatty acid(s) as main ingredient to be oxidized and a transition metal(s) as catalyst. Japanese Patent Kokai (Laid open) No. 4-29741 discloses an oxygen absorbent containing an aliphatic hydrocarbon(s) with an unsaturated group(s) and/or an unsaturated fatty acid compound(s) as main ingredient to be oxidized and a transition metal(s) as catalyst.

On the other hand, there has been desired an oxygen absorbent with a high performance in which an oxygen absorbing time to be required for decreasing an oxygen concentration in the interior of the system to an oxygen concentration of 0.1% or below to be able to neglect substantially oxygen is efficiently shortened. Thus, since an amount of an oxygen absorbent to be used is reduced and a size of an oxygen absorbent can be made small by improving an oxygen absorbing velocity, also from the viewpoint that recent resource saving and energy saving can be attained,it has been desired to attain such art for improvement of an oxygen absorbing velocity.

In above-mentioned prior art oxygen absorbent, an oxygen absorbing time is sharply prolonged since an oxygen absorbing velocity becomes low after absorbing a small amount of oxygen. Further, it is difficult to attempt not to contact perfectly the oxygen absorbent with oxygen during production of the oxygen absorbent. Also when the oxygen absorbent is actually applied or also when necessary amount of the oxygen absorbent is taken out from a sealed bag enclosed a specific amount of the oxygen absorbent and then remained amount of the oxygen absorbent is preserved, it is difficult to attempt to not to contact perfectly it with oxygen. Therefore, in order not to contact the oxygen absorbent with oxygen, it is necessary to handle it under an atmosphere of an inert gas such as nitrogen which results in inconvenience of its handling.

SUMMARY OF THE INVENTION

It is an object of the present invention to improve an oxygen absorbing velocity of an oxygen absorbent containing an aliphatic hydrocarbon(s) with an unsaturated group(s) and/or an unsaturated fatty acid compound(s) as main ingredient to be oxidized.

Further, it is an object of the present invention also to provide an oxygen absorbent convenient in handling in which an oxygen absorbing velocity is not so lowered even after absorbing a small amount of oxygen during its production or its application.

As a result of extensive studies to attain above-mentioned objects, the inventors have found that addition of non-transition metal salts(s) alone to an aliphatic hydrocarbon(s) with an unsaturated group(s) and/or an unsaturated fatty acid compound(s) as the main ingredient to be oxidized promotes no oxygen absorption, but addition of a mixture of a transition metal salt(s) with a non-transition metal salt(s) to above-mentioned main ingredient remarkedly promotes an oxygen absorbing velocity, and has accomplished the present invention Further, surprisingly, it has become possible to depress lowering of the oxygen absorbing velocity after absorbing a small amount of oxygen by mixing above-mentioned main ingredient with both the transition metal salt(s) and the non-transition metal salt(s).

That is, the present invention provides an oxygen absorbent comprising: an aliphatic hydrocarbon(s) with an unsaturated group(s) and/or an unsaturated fatty acid compound (s) and a catalyst containing both a transition metal salt(s) and a non-transition metal salt(s).

Further, in the present invention, it is preferable that the transition metal salt(s) is (are) at least one salt of metal selected from the group consisting of Cu, Fe, Co, Ni, Cr, and Mn and the non-transition metal salt(s) is (are) at least one salt of metal selected from the group consisting of Ca, Pb and Zn.

It is preferable also that a weight ratio of metal in a transition metal salt(s) to metal of a non-transition metal salt(s) is 1/0.01 to 1/40.

It is preferable that the aliphatic hydrocarbon(s) with an unsaturated group(s) and/or an unsaturated fatty acid compound(s) is a liquid hydrocarbon oligomer and particularly, a liquid butadiene oligomer.

DETAILED DESCRIPTION OF THE INVENTION

The present invention will be described in detail below.

Examples of the aliphatic hydrocarbon with an unsaturated group(s) as the main ingredient to be oxidized include liquid low or middle molecular polymers including liquid butadiene oligomers, liquid isoprene oligomers, squalene, liquid acetylene oligomers, liquid pentadiene oligomers, liquid oligoesteracrylate, liquid butene oligomers, liquid BR, liquid SBR, liquid NBR, liquid chloroprene oligomers, liquid sulfide oligomers, liquid isobutylene oligomers, liquid butyl rubber, liquid cyclopentadine type petroleum resins, liquid oligostyrene, liquid hydroxypolyolefin oligomers, liquid alkyd resins, liquid unsaturated polyester resins, and natural rubbers.

Examples of the unsaturated fatty acid compound include unsaturated fatty acids such as linoleic acid, linolenic acid, arachidonic acid, parinaric acid and dimer acid, and fats and oils containing esters of said unsaturated fatty acids and metal salts of acid unsaturated fatty acids.

As the unsaturated fatty acid, fatty acids obtained from vegetable oils or animal oils, i.e., linseed oil fatty acid, soybean oil fatty acid, tung oil fatty acid, rice bran oil fatty acid, sesame oil fatty acid, cotton seed oil fatty acid, rapeseed oil fatty acid, tall oil fatty acid, and the like are used.

Among the above-mentioned aliphatic hydrocarbons with an unsaturated group(s) and unsaturated fatty acid compounds, liquid butadiene oligomers are preferable since an amount of gases generating after absorbing oxygen is small and they emit few odor.

The aliphatic hydrocarbon with an unsaturated group(s) and/or the unsaturated fatty acid is not necessarily one kind of substance and may be a mixture of two species or above thereof, or a copolymer thereof. A small amount of impurities such as solvents mixed during production thereof may be allowed in an ordinary range.

The aliphatic hydrocarbon with an unsaturated group(s) and/or the unsaturated fatty acid compound(s) may have a substituted group(s) other than unsaturated group. For example, they may be substituted with a functional group (s)including alicyclic hydrocarbon group, aromatic hydrocarbon group, halogen group, hydroxyl group, hydroperoxy group, epoxy group, oxo group, carbonyl group, hydroxymethyl group, ether group, carboxyl group, ester group, acyl group, amino group, imino group, nitrile group, nitro group, nitroso group, amido group, imido group, cyano group, isocyano group, cyanate group, isocyanate, diazo group, azido group, hydrazino group, azo group, thio group, thioxo group, mercapto group, thiocarbonyl group, sulfonyl group, sulfinyl group, sulfone group, thiocyanate group, isothiocyanate group and heterocyclic group.

As the transition metal salt(s) to be used in the catalyst of the present invention, at least one salt of metal selected the group consisting of Cu, Fe, Co, Ni, Cr and Mn is (are) preferable. The transition metal (salt(s)) improves the oxygen absorbing velocity by rising catalytically an oxidation rate during oxidation of above-mentioned aliphatic hydrocarbon(s) with an unsaturated group(s) and/or an unsaturated fatty acid compound(s) with oxygen.

Examples of salts of Cu, Fe, Co, Ni, Cr and Mn include inorganic salts such as sulfate, chloride, and nitrate, organic salts such as fatty acid salts, naphthenate, rosin acid salts and acetylacetone salts, and alkyl metal compounds. Among salts of Cu, Fe, Co, Ni, Cr and Mn, considering oxygen absorption-promoting performance and security, a salt(s) of Fe and/or Mn is (are) preferable.

As the non-transition metal salt(s) to be used in co-catalyst of the present invention, at least one salt of metal selected from the group consisting of Ca, Pb and Zn is preferable. The oxygen absorbing velocity of the aliphatic hydrocarbon(s) with an unsaturated group(s) and/or the unsaturated fatty acid(s) is further improved by the combination of the transition metal salt(s) with the non-transition metal salt(s) of the present invention. Moreover, when the non-transition metal salt(s) of the present invention alone is (are) mixed with the fatty acid hydrocarbon(s) with an unsaturated group(s) and/or the unsaturated fatty acid compounds(s), the effect to promote oxygen absorption cannot be substantially provided, but a function to aid other catalyst i.e., the transition metal salts(s) is provided.

Examples of salts of Ca, Pb and Zn include inorganic salts such as sulfate, chloride and nitrate, organic salts such as fatty acid salts, naphthenate, rosin acid salts and acetylacetone salts, and alkyl metal compounds. Among salts of Ca, Pb and Zn, considering oxygen absorption-promoting performance and security, an inorganic salt of Zn or organic salt of Zn is preferable.

When above-mentioned main ingredient of oxygen absorbent and the catalyst to be used in the present invention are liquid, it is preferable to support them on a carrier substance.

The carrier substance to be used in the present invention is not limited on the condition that it surface area is large and contact area of the main ingredient to be oxidized containing above-mentioned catalyst with oxygen is widened. Examples of the carrier substance include paper or synthetic paper formed of natural pulp or synthetic pulp, non-woven fabric, porous film, silica, alumina, magnesia, titania, activated carbon, synthetic zeolite such as molecular sieves, natural zeolite such as mordenite, erionite, etc., clay minerals as pearlite, actvated clay, etc. and layer compounds such as hydrotalcite. Further, it is a practical method for also to select a carrier substance with gas absorbing ability or drying ability that has also been selected as a gas absorbent or a drying agent.

Each component in the oxygen absorbent is used in the following proportions. That is, per 100 parts by weight of total of both transition netal salt(s) and non-transition metal salts(s), the amount of metal in the transition metal salts is in the range of 0.001 to 2 parts by weight, preferably 0.005 to 1 parts by weight and more preferably 0.01 to 0.5 parts by weight, and that of the carrier substance is in the range of 1 to 1,000 parts by weight. The weight ratio of metal in the transition metal salt(s) to metal in the non-transition metal salt(s) is in the range of 1/0.01 to 1/40, preferably 1/0.05 to 1/30 and more preferably 1/0.1 to 1/20.

The oxygen absorbent of the present invention is used in an amount necessary to maintain an atmosphere in the interior of the system during a preservation period to at least substantially oxygen non-existing state and preferably in 1.1 to 10 times the amount. The word "substantially oxygen non-existing state" herein means an oxygen concentration of 5% or below, preferably 1% or below and more preferably 0.1% or below.

In the present invention, the oxygen absorbent, the gas absorbent, the drying agent and the humidity adjusting agent can be also used in a mixture. Each the components or the mixture is suitably used in a form of powders, granules, tablets, sheets, etc.

It is not preferable to permit direct contact between each the oxygen absorbent, the gas absorbent, the drying agent and the humidity adjusting agent with an article to be preserved. They are usually used as a parcel covered with a gas permeable material used as a substrate, e.g., paper, non-woven fabric, plastic, etc. A portion or all of the oxygen absorbent may be used together with the gas absorbent, the drying agent and the humidity adjusting agent in one parcel or in separate parcels. The form of the parcel is not limited and the form such as small bag, sheet, blister parcel, etc. is exemplified depending upon object to be used. Packing materials and structures of the parcel are not limited.

It is preferable to conduct dust proofing treatment on the parcel. As the dust proofing treatment, it is possible to cover above-mentioned parcel with a non-dust proofing parcel material that does not hinder the permeation of either oxygen, inorganic gas, organic gas and moisture and releases no dust generated from the parcel into exterior, thus forming a double-packed parcel. However, when the dust proofing treatment has been conducted for the parcel itself, the parcel need not be further covered with a dust proofing material.

The gas absorbent to be used in the present invention absorbs mainly gases other than oxygen, e.g., high volatility low molecular substances prior to oxygen absorption contained in a liquid hydrocarbon oligomer with a unsaturated group(s) as the main ingredient to be oxidized, gas components produced in the oxygen absorbing reaction such as hydrogen, carbon monoxide, carbon dioxide, hydrocarbons, aldehydes, ketones, carboxylic acids, etc., and corrosive gas components existing in a sealed atmosphere such as hydrogen sulfide, ammonia, etc., and is not limited on the condition that above-mentioned objects are attained.

Examples of the gas absorbent include synthetic zeolite typically, including alumina and molecular sieves, natural zeolite such as mordenite, erionite, etc., clay minerals such pearlite, acidic clay, activated clay, etc., porous glass such as silica gel, activated carbons such as activated carbon, activated carbon fiber, molecular sieving carbon, bone charcoal, etc., oxides of alkaline earth metal such as calcium oxide, barium oxide, magnesium oxide, etc., hydroxides such as sodium hydroxide, potassium hydroxide, calcium hydroxide, magnesium silicate, aluminum silicate, high molecular adsorbent, sodium sulfate, sodium carbonate, potassium carbonate, soda lime, ascarite, organic acid salt and organic amines. It is a practical method for use also to select a carrier substance of the main ingredient to be oxidized, having gas absorbing ability as the gas absorbent In such case, gas absorbent need not be further added. The gas absorbent is used alone or in a mixture of two species or above.

The drying agent can be suitably used depending upon kinds of article to be preserved. For example, in preservation of products such as metal products in which existence of moisture is not preferable, it is preferable to add positively the drying agent and remove substantially moisture.

Examples of the drying agent include silica gel, alumina, synthetic zeolite, typically, including molecular sieves, natural zeolite such as mordenite, erionite, etc., clay minerals such as pearlite, acidic clay, activated clay, etc., porous glass, magnesium silicate, aluminum silicate, high molecular adsorbent, activated carbon, activated carbon fiber, molecular sieving carbon, bone charcoal, calcium oxide, calcium sulfate, calcium chloride, calcium bromide, barium oxide, barium bromide, barium perchlorate, magnesium chloride, magnesium oxide, magnesium sulfate, magnesium perchlorate, aluminum sulfate, sodium sulfate, sodium hydroxide, sodium carbonate, potassium carbonate, potassium hydroxide, zinc chloride, zinc bromide, lithium perchlorate, etc.

Further, it is a practical method for use also to select a carrier substance of the main ingredient to be oxidized or a gas absorbent having drying ability as the drying agent. In such case, a drying agent need not be further added. The drying agent is used alone or in a mixture of two species or above.

In the present invention, the humidity adjusting agent can be positively added to articles such as paper, wood, etc., in which it is preferable to preserve at a relative humidity of 40 to 60%. The humidity adjusting agent is not limited on the condition that a relative humidity of sealed atmosphere is adjusted to a prescribed value.

Examples of the humidity adjusting agent include cottons, papers or diatomaceous earths impregnated with an aqueous saturated solution of barium chloride dihydrate, potassium acetate, sodium acetate trihydrate, calcium chloride hexahydrate, calcium nitrate tetrahydrate, calcium sulfate pentahydrate chromium trioxide, oxalic acid dihydrate, phosphoric acid hemidydrate, potassium bromide, potassium fluoride, potassium hydrogen sulfate, potassium iodide, potassium nitrite, potassium carbonate dihydrate, patassium perchronate, lithium chloride monohydrate, magnesium acetate tetrahydrate, magnesium nitrate hexahydrate, ammonium chloride, ammonium sulfate, sodium bromide, sodium bromide dihydrate, sodium bromate, sodium chlorate, sodium fluoride, sodium iodide, sodium nitrite, sodium carbonate decahydrate, sodium dichromate dihydrate, sodium sulfate decahydrate, lead nitrate, zinc nitrate hexahydrate, zinc sulfate heptahydrate, etc., and cottons, papers or diatomaceous earths impregnated with an aqueous mixed solution of water/glycerine, and also papers, cottons, leathers, rubbers, woods, charcoals containing moisture corresponding to equilibrium moisture content. Further, when an article to be preserved such as papers, cottons, leathers, rubbers, woods, charcoals, etc., has a humidity adjusting function, a humidity adjusting agent need not further added.

The necessary amount of the gas absorbent varies with absorbing ability of the gas absorbent. It is necessary to select properly an amount capable of removing substantially both gases containing in the main ingredient prior to absorbing oxygen and gases generating after absorbing oxygen. It is preferable that the amount is in the range of 1 to 5,000 parts by weight per 100 parts by weight of the main ingredient to be oxidized.

When the drying agent is used in the present invention, the amount of the drying agent is an amount capable of maintaining the state in which moisture in an interior space of a sealed container with a gas barrier property has been substantially removed and preferably in the range of 1.1 to 500 times above-mentioned amount and selected properly depending upon a barrier property of a sealed container with a gas barrier property. Herein, the state in which moisture has been substantially removed means a relative humidity of 10% or below, preferably 5% or below and more preferably 1% or below.

When the humidity adjusting agent is used in the present invention, the amount of the humidity adjusting agent is an amount necessary to maintain at least a relative humidity in a sealed container with a gas barrier property to a prescribed value and preferably in the range of 1.1 to 500 times above-mentioned amount.

As the sealed container with a gas barrier property, according its object, for example, containers with a high gas barrier property such as plastic containers, film bags, metallic containers and glassy containers are preferable. For example, in a film bag, it is preferable to use a material with a high gas barrier property such as a film laminated a metal foil such as aluminum foil and a laminate film vapor-deposited silica or aluminum oxide. It is preferable that the sealed container with a gas barrier property has an oxygen permeability of 10 ml/m$^2$·day·atm or below at 25° C. at a relative humidity (hereinafter, referred to as "RH") of 60% and a water vapor permeability of 1 g/m$^2$·day or below at 40° C. at 90% RH.

On the other hand, when an article to be preserved is preserved in a sealed container, the interior of the container may be replaced with a dried inert gas such as nitrogen, argon. In such case, replacement with a gas leads to reduction of each amount of the oxygen absorbent, the gas absorbent and the drying agent.

PREFERRED EMBODIMENTS OF THE INVENTION

Some of the preferred embodiments of the present invention will be described in detail below.

Referring to Examples, which are not intended to limit the scope of the present invention.

EXAMPLE 1

1.10 g of a liquid butadiene oligomer as the main ingredient, 18.6 mg of a mineral spirit solution of manganese naphthenate (Mn:6 wt %) as the transition metal salt and 14.0 mg of a mineral spirit solution of zinc naphthenate (Zn:8 wt %) as the non-transition metal salt were mixed, thus obtaining 1.13 g of a uniform mixed solution (Mn:0.1 wt %, Zn:0.1 wt %). An oxygen absorbent composition supported 1.13 g of the uniform mixed solution on 3.38 g of a natural zeolite was filled into a small bag formed of a gas-permeable packing material (paper/porous polyethylene, inner size 45 mm×90 mm) and then periphery of the small bag was heat sealed, thus preparing an oxygen absorbent parcel.

The oxygen absorbent parcel thus prepared was enclosed in a bag formed of an aluminum foil laminate plastic film: size 220 mm×300 mm (hereinafter, referred to as "Al bag") together with 500 ml of air at 25 c and 60% RH to seal hermetically.

The hermetically sealed Al bag was allowed to stand under an atmosphere of 25° C. and 60% RH and oxygen absorbing time required to attain an oxygen concentration of 0.1% or below in the system was measured. The result was shown in Table 1.

Another new oxygen absorbent parcel prepared in the same manner as above was enclosed in an Al bag together with 90 ml of air (oxygen 18 ml) at 25° C. and 60% RH to seal hermetically. It was confirmed that an oxygen concentration of 0.1% or below was attained in the system after 24 hour and 18 ml of oxygen was absorbed. Then, the Al bag was opened and the oxygen absorbent parcel was taken out. The oxygen absorbent taken out from the Al bag was again enclosed in the Al bag together with 500 ml of new air at 25° C. and 60% RH to seal hermetically. The oxygen absorbing time after absorbing 18 ml of oxygen was measured. The result also was shown in Table 1.

EXAMPLE 2

The experiment was conducted in the same manner as in Example 1 except that tall oil fatty acid manganese salt was used instead of manganese naphthenate. The result was shown in Table 1.

COMPARATIVE EXAMPLE 1

The experiment was conducted in the same manner as in Example 1 except that the mineral spirit solution of zinc naphthenate was not added. The result was shown in Table 1.

COMPARATIVE EXAMPLE 2

The experiment was conducted in the same manner as in Example 1 except that the mineral spirit solution of manganese naphthenate was not added. The result was shown in Table 1.

In Example 1, addition of zinc salt as the non-transition metal salt improved oxygen absorbing velocity more than in Comparative Example 1 and depressed lowering of oxygen absorbing velocity after absorbing 18 ml of oxygen.

In Example 2, although manganese naphthenate was changed to tall oil fatty acid manganese salt, the same advantageous effects were provided.

In Comparative Example 2, although a mineral spirit solution of manganese naphthenate was not added and only a mineral spirit solution of zinc naphthenate was added, oxygen absorption was not promoted.

EXAMPLE 3

1.10 g of a liquid isoprene oligomer as the main ingredient, 18.6 mg of a mineral spirit solution of cobalt naphthenate (Co: 6 wt %) as the transition metal salt and 4.7 mg of a mineral spirit solution of lead naphthenate (Pb: 24 wt %) as the non-transition metal salt were mixed, thus obtaining 1.12 g of an uniform mixed solution (Co: 0.1 wt %, Pb: 0.1 wt %). The experiment was conducted in the same manner as in Example 1 except that above-mentioned uniform mixed solution was used. The result was shown in Table 2.

COMPARATIVE EXAMPLE 3

The experiment was conducted in the same manner as in Example 3 except that the mineral spirit solution of lead naphthenate was not added. The result was shown in Table 2.

COMPARATIVE EXAMPLE 4

The experiment was conducted in the same manner as in Example 3 except that the mineral spirit solution of cobalt naphthenate was not added. The result was shown in Table 2.

EXAMPLE 4

1.10 g of squalene as the main ingredient, 14.0 mg of a mineral spirit solution of copper oleate (Cu: 8 wt %) as the transition metal salt and 37.3 mg of a mineral spirit solution of calcium naphthenate (Ca: 3 wt %) as the non-transition metal salt were mixed, thus obtaining 1.15 g of an uniform mixed solution (Cu: 0.1 wt %, Ca: 0.1 wt %). The experiment was conducted in the same manner as in Example 1 except that above-mentioned uniform mixed solution was used. The result was shown in Table 2.

COMPARATIVE EXAMPLE 5

The experiment was conducted in the same manner as in Example 4 except that the mineral spirit solution of calcium naphthenate was not added. The result was shown in Table 2.

COMPARATIVE EXAMPLE 6

The experiment was conducted in the same manner as in Example 4 except that the mineral spirit solution of copper oleate was not added.

EXAMPLE 5

1.10 g of a soybean oil as the main ingredient, 22.4 mg of a mineral spirit solution of iron naphthenate (Fe: 5 wt %) as the transition metal salt and 14.0 mg of a mineral spirit solution of zinc octate (Zn: 8 wt %) as the non-transition metal salt were mixed, thus obtaining 1.14 g of an uniform mixed solution (Fe: 0.1 wt %, Zn: 0.1 wt %). The experiment was conducted in the same manner as in Example 1 except that above-mentioned uniform mixed solution was used. The result was shown in Table 3.

COMPARATIVE EXAMPLE 7

The experiment was conducted in the same manner as in Example 5 except that the mineral spirit solution of zinc octate was not added. The result was shown in Table 3.

COMPARATIVE EXAMPLE 8

The experiment was conducted in the same manner as in Example 5 except that the mineral spirit solution of iron naphthenate was not added. The result was shown in Table 3.

EXAMPLE 6

1.10 g of tall oil fatty acid as the main ingredient, 56 mg of nickel acetylacetonate (Ni: 20 wt %) as the transition metal salt and 45 mg of zinc acetylacetonate (Zn: 25 wt %) as the non-transition metal salt were mixed, thus obtaining 1.20 g of an uniform mixed solution (Ni: 1 wt %, Zn: 1 wt %). The experiment was conducted in the same manner as in Example 1 except that above-mentioned uniform mixed solution was used. The result was shown in Table 4.

COMPARATIVE EXAMPLE 9

The experiment was conducted in the same manner as in Example 6 except that zinc acetylacetonate was not added. The result was shown in Table 4.

COMPARATIVE EXAMPLE 10

The experiment was conducted in the same manner as in Example 6 except that nickel acetylacetonate was not added. The result was shown in Table 4.

EXAMPLE 7

0.88 g of tall oil fatty acid and 0.22 g of a liquid isoprene oligomer (number average molecular weight 13,000, viscosity 13,000 cP) as the main ingredient, 75 mg of a chromium acetylacetonate (Cr: 15 wt %) as the transition metal salt and 45 mg of a zinc acetylacetonate (Zn: 25 wt %) as the non-transition metal salt were mixed, thus obtaining 1.22 g of an uniform mixed solution (Cr: 1 wt %, Zn: 1 wt %). The experiment was conducted in the same manner as in Example 1 except that above-mentioned uniform mixed solution was used. The result was shown in Table 4.

COMPARATIVE EXAMPLE 11

The experiment was conducted in the same manner as in Example 7 except that zinc acetylacetonate was not added. The result was shown in Table 4.

In Example 6, addition of zinc salt as the non-transition metal salt improved oxygen absorbing velocity more than in Comparative Example 9 and depressed lowering of oxygen absorbing velocity after absorbing 18 ml of oxygen.

Further, also in Example 7, addition of zinc salt as the non-transition metal improved oxygen absorbing velocity more than in Comparative Example 10 and depressed lowering of oxygen absorbing velocity after absorbing 18 ml of oxygen.

EXAMPLES 8 to 14 and Comparative Examples 12 to 13 Each experiment of Examples 8 to 14 and Comparative Example 12 to 13 was conducted in the same manner as in Example 1 except that Zn content or both Zn concentration and Mn concentration in the uniform mixed solution in Example 1 obtained by mixing a liquid butadiene oligomer, a mineral spirit solution of manganese naphthenate acid solution and a mineral spirit solution of zinc naphthenate was changed to each content shown in Tables 5 and 6. The results were shown in Tables 5 and 6.

EXAMPLE 15

The experiment was conducted in Example 1 except that 4.0 g of calcium oxide as the drying agent was added in the oxygen absorbent parcel of Example 1. The result was shown in Table 7.

EXAMPLE 16

The experiment was conducted in Example 1 except that 0.68 g of granulated activated carbon as a deodorant was added in the oxygen absorbent parcel of Example 1. The result was shown in Table 7.

EXAMPLE 17

A mixture obtained by mixing sufficiently 92 g of glycerine with 8 g of water was impregnated with 300 g of diatomaceous earth, thus preparing a humidity adjusting agent.

The experiment was conducted in Example 1 except that 9.0 g of the humidity adjusting thus prepared was added in the oxygen absorbent parcel of Example 1. The result was shown in Table 7.

In the present invention, an oxygen absorbent composition promoted remarkably an oxygen absorbing velocity by adding a catalyst containing both the transition metal salt(s) and the non-transition metal salt(s) to an aliphatic hydrocarbon(s) with an unsaturated group(s) and/or an unsaturated fatty acid compound(s) as the main ingredient to be oxidized is obtainable.

TABLE 1

| Example or Comp. Ex. | Example 1 | Example 2 | Comp. Ex. 1 | Comp. Ex. 2 |
| --- | --- | --- | --- | --- |
| Main ingredient | Liquid butadiene oligomer | Liquid butadiene oligomer | Liquid butadiene oligomer | Liquid butadiene oligomer |
| Transition metal salt | Manganese naphthenate | Tall oil fatty acid salt manganese | Manganese naphthenate | — |
| Non-transition metal salt | Zinc naphthenate | Zinc naphthenate | — | Zinc naphthenate |
| Time required to attain an oxygen concentration of 0.1% (hr) (before absorbing 18 ml of oxygen) | 10 | 10 | 18 | 336 or above |
| Time required to attain an oxygen concentration of 0.1% (hr) (after absorbing 18 ml of oxygen) | 16 | 16 | 28 | — |

TABLE 2

| Example or Comp. Ex. | Example 3 | Comp. Ex. 3 | Comp. Ex. 4 | Example 4 | Comp. Ex. 5 | Comp. Ex. 6 |
| --- | --- | --- | --- | --- | --- | --- |
| Main ingredient | Liquid isoprene oligomer | Liquid isoprene oligomer | Liquid isoprene oligomer | Squalene | Squalene | Squalene |
| Transition metal salt | Cobalt naphthenate | Cobalt naphthenate | — | Copper oleate | Copper oleate | — |
| Non-transition metal salt | Lead naphthenate | — | Lead naphthenate | Calcium naphthenate | — | Calcium naphthenate |
| Time required to attain an oxygen concentration of 0.1% (hr) (before absorbing 18 ml of oxygen) | 48 | 72 | 336 or above | 30 | 40 | 336 or above |
| Time required to attain an oxygen concentration of 0.1% (hr) (after absorbing 18 ml of oxygen) | 64 | 128 | — | 40 | 72 | — |

TABLE 3

| Example or Comp. Ex. | Example 5 | Comp. Ex. 7 | Comp. Ex. 8 |
| --- | --- | --- | --- |
| Main ingredient | Soybean oil | Soybean oil | Soybean oil |
| Transition metal salt | Iron naphthenate | Iron naphthenate | — |
| Non-transition metal salt | Zinc octyl | — | Zinc octyl |
| Time required to attain an oxygen concentration of 0.1% (hr) (before absorbing 18 ml of oxygen) | 18 | 24 | 336 or above |
| Time required to attain an oxygen concentration of 0.1% (hr) (after absorbing 18 ml of oxygen) | 22 | 30 | — |

TABLE 4

| Example or Comp. Ex. | Example 6 | Comp. Ex. 9 | Comp. Ex. 10 | Example 7 | Comp. Ex. 11 |
| --- | --- | --- | --- | --- | --- |
| Main ingredient | Tall oil fatty acid | Tall oil fatty acid | Tall oil fatty acid | Tall oil fatty acid + liquid isoprene oligomer | Tall oil fatty acid + liquid isoprene oligomer |
| Transition metal salt | Nickel acetylacetonate | Nickel acetylacetonate | — | Chromium acetylacetonate | Chromium acetylacetonate |
| Non-transition metal salt | Zinc acetylacetonate | — | Zinc acetylacetonate | Zinc acetylacetonate | — |
| Time required to attain an oxygen concentration of 0.1% (hr) (before absorbing 18 ml of oxygen) | 36 | 50 | 336 or above | 32 | 41 |

TABLE 4-continued

| Example or Comp. Ex. | Example 6 | Comp. Ex. 9 | Comp. Ex. 10 | Example 7 | Comp. Ex. 11 |
|---|---|---|---|---|---|
| Time required to attain an oxygen concentration of 0.1% (hr) (after absorbing 18 ml of oxygen) | 45 | 67 | — | 44 | 59 |

TABLE 5

| Example or Comp. Ex. | Example 8 | Example 9 | Example 1 | Example 10 | Example 11 | Example 12 | Comp. Ex. 1 |
|---|---|---|---|---|---|---|---|
| Main ingredient | Liquid butadiene oligomer | Liquid butadiene oligomer | Liquid butadiene oligomer | Liquid butadiene oligomer | Liquid butadiene oligomer | Liquid butadiene oligomer | Liquid butadiene oligomer |
| Mn concentration* (manganese naphthenate) (wt %) | 0.1 | 0.1 | 0.1 | 0.1 | 0.1 | 0.1 | 0.1 |
| Zn concentration* (zinc naphthenate) (wt %) | 0.01 | 0.05 | 0.1 | 0.5 | 1 | 2 | — |
| Weight ratio of Mn/Zn metal | 1/0.1 | 1/5 | 1/1 | 1/5 | 1/10 | 1/20 | — |
| Time required to attain an oxygen concentration of 0.1% (hr) (before absorbing 18 ml of oxygen) | 15 | 10 | 10 | 8 | 7 | 10 | 18 |
| Time required to attain an oxygen concentration of 0.1% (hr) (after absorbing 18 ml of oxygen) | 24 | 16 | 15 | 12 | 10 | 14 | 28 |

Note: *Metal concentration in the uniform mixed solution.

TABLE 6

| Example or Comp. Ex. | Example 13 | Comp. Ex. 12 | Example 14 | Comp. Ex. 13 |
|---|---|---|---|---|
| Main ingredient | Liquid butadiene oligomer | Liquid butadiene oligomer | Liquid butadiene oligomer | Liquid butadiene oligomer |
| Mn concentration* (manganese naphthenate) (wt %) | 0.05 | 0.05 | 0.2 | 0.2 |
| Zn concentration* (zinc naphthenate) (wt %) | 0.05 | — | 0.2 | — |
| Weight ratio of Mn/Zn metal | 1/1 | — | 1/1 | — |
| Time required to attain an oxygen concentration of 0.1% (hr) (before absorbing 18 ml of oxygen) | 18 | 24 | 14 | 16 |
| Time required to attain an oxygen concentration of 0.1% (hr) (after absorbing 18 ml of oxygen) | 22 | 30 | 18 | 26 |

Note: *Metal concentration in the uniform mixed solution.

TABLE 7

| Example or Comp. Ex. | Example 1 | Example 15 | Example 16 | Example 17 |
| --- | --- | --- | --- | --- |
| Main ingredient | Liquid butadiene oligomer | Liquid butadiene oligomer | Liquid butadiene oligomer | Liquid butadiene oligomer |
| Transition metal salt | Manganese naphthenate | Manganese naphthenate | Manganese naphthenate | Manganese naphthenate |
| Non-transition metal salt | Zinc naphthenate | Zinc naphthenate | Zinc naphthenate | Zinc naphthenate |
| Other enclosed substance | — | Drying agent (calcium oxide) | Deodorant (granulated active carbon | Humidity adjusting agent (glycerine + water/ diatomaceous earth) |
| Time required to attain an oxygen concentration of 0.1% (hr) (before absorbing 18 ml of oxygen) | 10 | 10 | 10 | 10 |
| Time required to attain an oxygen concentration of 0.1% (hr) (after absorbing 18 ml of oxygen) | 16 | 16 | 16 | 16 |

What is claimed is:

1. An oxygen absorbent comprising:
an aliphatic hydrocarbon (s) with an unsaturated group (s) and/or an unsaturated fatty acid compounds (s) and a catalyst containing both at least one salt of metal selected from the group consisting of Cu, Fe, Co, Ni, Cr, and Mn and at least one salt of metal selected from the group consisting of Pb and Zn, wherein a weight ratio of metal in at least one salt of metal selected from the group consisting of Cu, Fe, Co, Ni, Cr and Mn to metal in at least one salt of metal selected from the group consisting of Pb and Zn is 1/0.01 to 1/40.

2. An oxygen absorbent according to claim 1, wherein said aliphatic hydrocarbon(s) with an unsaturated group(s) and/or an unsaturated fatty acid compound(s) is a liquid hydrocarbon oligomer with an unsaturated group(s).

3. An oxygen absorbent according to claim 2, wherein said liquid hydrocarbon oligomer is a liquid butadiene oligomer.

* * * * *